United States Patent
Hutchison

(10) Patent No.: US 6,366,896 B1
(45) Date of Patent: *Apr. 2, 2002

(54) ADAPTIVE AGENT USING NEURAL NETWORK

(76) Inventor: William R. Hutchison, 2002 Linden Dr., Boulder, CO (US) 80304

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,754

(22) Filed: Mar. 17, 1998

Related U.S. Application Data
(60) Provisional application No. 60/039,347, filed on Mar. 18, 1997.

(51) Int. Cl.[7] ............................................. G06F 15/18
(52) U.S. Cl. ........................... 706/14; 706/15; 706/16; 706/18; 706/25; 706/26
(58) Field of Search .............................. 706/14–16, 18, 706/25, 26

(56) References Cited

U.S. PATENT DOCUMENTS

| | | | | |
|---|---|---|---|---|
| 5,448,681 A | * | 9/1995 | Khan | 706/23 |
| 5,586,218 A | | 12/1996 | Allen | 706/12 |
| 5,802,506 A | * | 9/1998 | Hutchison | 706/20 |

FOREIGN PATENT DOCUMENTS

| | | | | |
|---|---|---|---|---|
| WO | 92/14200 | * | 8/1992 | G06K/9/66 |

OTHER PUBLICATIONS

Stephen, K. R. & Hutchison, W. R., "Behavior Analysis and the Quest for Machine Intelligence", Educational Technology, No. 33, pp. 52–61, 1993.*
W. Hutchison, "Teaching an Agent to Speak and Listen with Understanding: Why and How?, " Online Proceedings of the Intelligent Agents Workshop, CIKM [retrieved on Feb. 15, 2000]. Retrieved from the Internet:<URL: http//www.cs.um-bc.edu/~cikm/iia/submitted/viewing/whutchi.html>, Dec. 1995.*
"Publications of Research Related to Behavior Systems" [retrieved on Feb. 15, 2000]. Retrieved from the Internet: <URL: http//www.csn.net/behavsys/pubs.html>.*
K.R. Stephens, "Behavior Analysis and Intelligent Agent Theory," Online Proceedings of the Intelligent Information Agents Workshop, CIKM [retrieved on Feb. 15, 2000]. Retrieved from the Internet: <URL: http://www.cs.umb-c.edu/~cikm/iia/submitted/viewing/krs$_{13}$ ci, Dec. 1995.*
C.–S. Lin et al., Selection of Learning Parameters for CMAC–Based Adaptive Critic Learning, IEEE Transactions on Neutral Networks, vol. 6, No. 3, pp. 642–647, May 1995.*
P.J. Werbos, "Backpropagation and Neurocontrol: A Review and Prospectus," International Joint Conference on Neural Networks, vol. 1, pp. 209–216, Jun. 1989.*
Article Entitled "The 7G Computer Modeling of Behavior Project" demo at 7G at Simulation of Adaptive Behavior Conference, Aug. 1994.
Commentary On "We Also Need Complete Behavioral Models" By William R. Hutchison, pp. 224–228.
Article "No Bad Dogs: Ethological Lessons for Learning in Hamsterdam" By B. M. Blumberg et al. presented at Simulation of Adaptive Behavior Conference, Sep. 1996.

* cited by examiner

Primary Examiner—George B. Davis
(74) Attorney, Agent, or Firm—Stuart T. Langley; Hogan & Hartson LLP

(57) ABSTRACT

An adaptive agent including an artificial neural network having a plurality of input nodes for receiving input signals and a plurality of output nodes generating responses. A situation value unit receives a plurality of the responses and generating a situation value signal. A change sensor coupled to receive the situation value signal generates an output signal representing a change of the situation value signal from a prior time to a current time. A connection coupling the change sensor output to one of the input nodes of the artificial neural network.

24 Claims, 2 Drawing Sheets

ADAPTIVE AGENT USING NEURAL NETWORK

RELATED PATENT APPLICATIONS

The present invention claims the benefit of the filing date of U.S. Provisional Application No. 60/039,347 filed on Mar. 18, 1997 and is related to U.S. Pat. No. 5,802,506 issued on Sep. 1, 1998 both of which are invented by the inventor of the instant application and are incorporated herein by reference.

BACKGROUND OF THE INVENTION

1. Field of the Invention

The present invention relates, in general to adaptive critic systems, and, more particularly, to adaptive critic systems in which a change in situation value is used as a network input.

2. Relevant Background

Artificial neural networks (ANNs) are known, and are described in general in U.S. Pat. No. 4,912,654 issued Mar. 27, 1990 to Wood (Neural networks learning method) and in U.S. Pat. No. 5,222,194 issued Jun. 22, 1993 to Nishimura (Neural Network With Modification Of Neuron Weights And Reaction Coefficient), both of which are incorporated herein by reference.

ANNs are systems used to learn mappings from input vectors, X, to output vectors, Y. In a static and limited environment, a developer provides a training set—a database—that consists of a representative set of cases with sensor inputs (X) and corresponding desired outputs (Y), such that the network can be trained to output the correct Y for each given input X, but is limited to the developer's specification of correct outputs for each case, and therefore may not succeed in optimizing the outcomes to general users.

In the more general case, it is valuable or essential for the system to learn to output so as to optimize the expected value of a mathematical "Primary Value Function", usually a net present expected value of some function over time. It may also be essential to learn a sequence of actions to optimize the function, rather than being restricted to a single optimal output at each moment (e.g., a robot may have to move away from a nearby object having a local maximum value, in order to acquire an object having a larger, or global, maximum value). The preferred class of techniques meeting these requirements is adaptive critics, described in Miller, Sutton, and Werbos, Eds., Neural networks for control. Cambridge, Mass.: MIT Press (1990), and in Barto, A., Reinforcement learning and adaptive critic methods. In D. A. White & D. Sofge (Eds.), Handbook of Intelligent Control: Neural, Fuzzy, and Adaptive Approaches. Van Nostrand (1992).

Connecting actual or simulated sensors and actual or simulated actuators to the inputs and outputs, respectively, of adaptive critics and related systems, make complete adaptive autonomous agents. These agents are a focus of some researchers in robotics sometimes called "behavior-oriented artificial intelligence" as described in U.S. Pat. No. 5,124,918.

The advantages of these systems are that they are readily adapted to acting in real environments. With adaptive critics and related techniques, a training set may either be constructed by the developer, or collected from actual historical data, or created by putting the system into contact with the actual application environment.

While ANN techniques have several major advantages (they learn rather than requiring programming, they can accept many forms of inputs, and certain designs can perform mathematical optimization of a value function) there are classes of problems that have been considered difficult or impossible to solve. Examples of problems whose solution using a linear neural network is not obvious include the matching-to-sample (MTS) problem and delayed MTS problem. In these problems the agent is required to respond so as to indicate whether two stimuli match (or correspond in some other way) to each other or not. The stimuli can be of any kind, and may be separated in space or time. This problem is a general version related to the more specific problem of implementation of an exclusive-or (XOR) function using neural networks. The XOR problem is a prototypical case of a nonlinearly separable problem discussed at length by M. Minsky and S. Papert, in Perceptrons, Cambridge, Mass. (MIT Press, 1969). The Perceptrons reference argues that hidden nodes are required to solve the XOR problem. It is desirable to find an architecture and method for operating an ANN that can solve or simplify the solution to this class of problem as an alternative or adjunct to using networks with hidden nodes.

SUMMARY OF THE INVENTION

Briefly stated, the current invention involves creating a sensor input to an artificial neural network, where the input's activation is determined by the change in situation value. Alternatively, the activation may be determined by a preselected function of the change in situation value. As a result of this connection, the agent is responsive to prior increases and decreases in situation value. This connection enables or enhance an agent's ability to solve various problems.

In a particular implementation, an adaptive agent includes an artificial neural network having a plurality of input nodes for receiving input signals and a plurality of output nodes generating responses. A situation value unit receives input from a plurality of the responses and generates a situation value signal. A change sensor coupled to receive the situation value signal generates an output signal representing a change of the situation value signal from a prior time to a current time. A connection coupling the change sensor output to one of the input nodes of the artificial neural network.

DETAILED DESCRIPTION OF THE PREFERRED EMBODIMENTS

Figure 1:
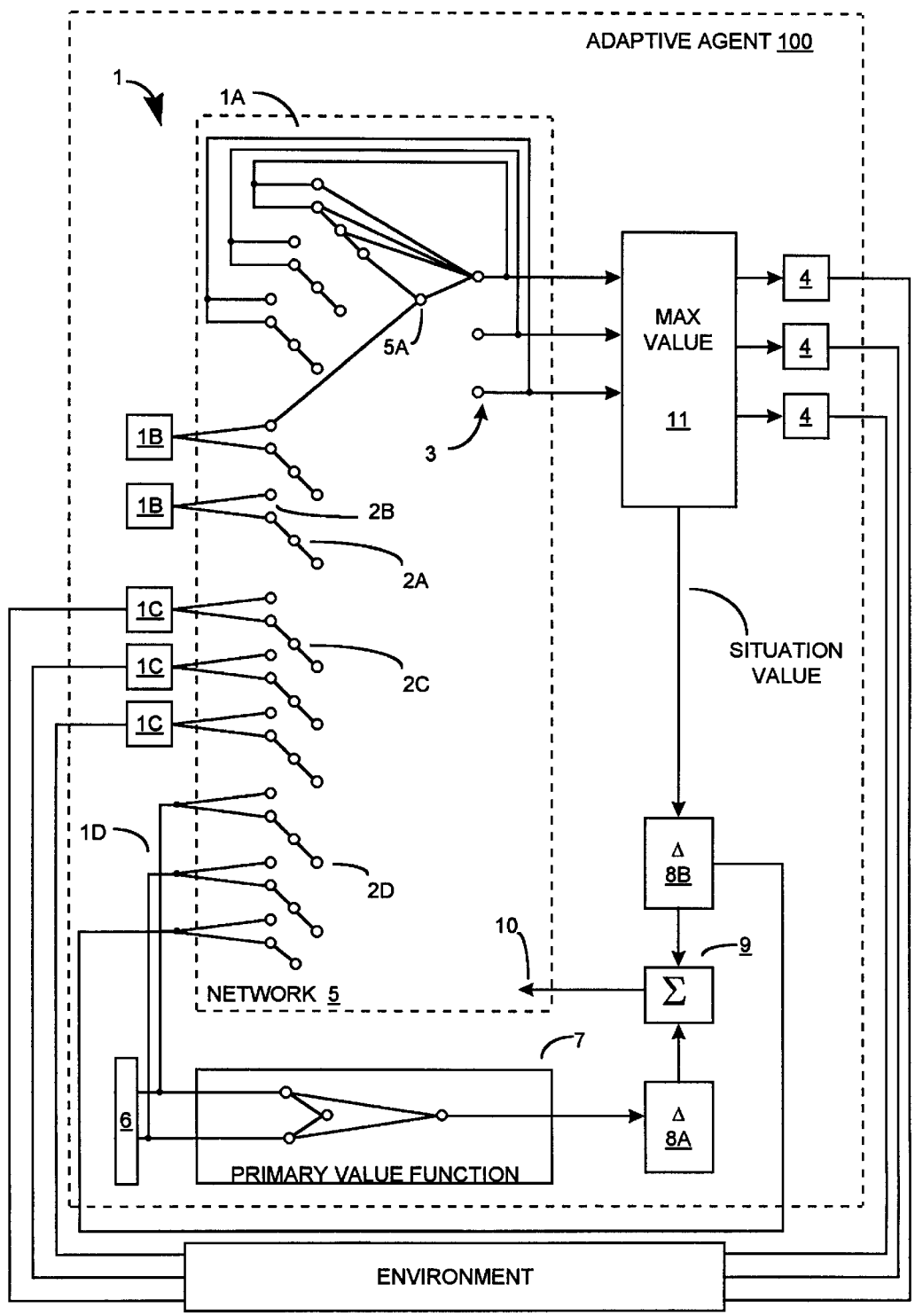
FIG. 1 is a schematic diagram of an architecture suitable for implementing the invention.

Autonomous adaptive agents can learn simple behaviors by direct contact with environmental contingencies. For example, a naive robotic agent may learn to avoid bumping into objects as a result of repeatedly sensing certain visual changes prior to bumping into objects, if the bumping creates a punishing learning signal. Reinforcement learning occurs as the result of environmental contingencies, that have three elements: the situation or input pattern, the behavior of the agent, and the consequences (reinforcement or punishment). After a behavior has been performed, the connections between the sensory inputs and that behavior are strengthened if the consequence was positive and weakened if the consequence was negative. To train a robotic agent by direct interaction, the agent is repeatedly placed in the target situations, and the agent's behaviors are observed. The consequences are delivered to the agent (if the environment does not deliver them automatically). Not only is this very time consuming, but it must typically be repeated many times to try different variations in procedural or agent parameters.

The instant invention involves an improvement to adaptive systems provided by creating a sensor input to the network, whose activation is determined by the change in a "situation value" or some function of that change. The situation value is a signal generated or derived from the current response signals on the output nodes of an artificial neural network.

As a result of this new connection, the agent's responses can be controlled by prior increases and decreases in situation value. This connection can enable or enhance an agent's ability to solve various problems. An example of a problem whose solution is not obvious is described by Hutchison, the inventor of the instant application, in a the Journal of the Experimental Analysis of Behavior commentary entitled "We also need Complete Behavior Models" published in March 1997, a copy of which is attached to the instant specification and incorporated by reference herein.

In accordance with the present invention, the agent responds to indicate whether two stimuli match each other or not. The stimuli can be of any kind, and may be separated in space or time. Following standard practice of researchers concerned with this class of problems, especially the field of stimulus equivalence, the stimuli to be evaluated for matching or equivalence may be of different sensory modes, dimensions, etc. For example, any two of the following can be considered to match:

picture of a dog a living dog the written word "DOG"

the spoken sound "DOG"

the Spanish word "perro"

a dog of different color, size, breed

It is worth noting that matching is often a matter of relative degree, where the closest match is chosen from a set. In some cases, the degree of matching is itself the focus of attention, as when rating how similar two objects are. The present invention enables both of these cases. It should be obvious that the invention also enables selection in "oddity" problems, where the task is to select the least matching object.

In more complex cases, the verbal response may be extended (e.g. "blue ball") and the comparison stimulus may partially match (e.g., "blue hat" or "red ball"). These extended sequences produce an extended sequence of situation value changes, in which perfect matches will differ from partial matches. The present invention therefore handles these cases, assuming the agent's architecture can learn to discriminate the differences between such temporal patterns.

The ability to identify matches results largely from the architectural innovation in accordance with the present invention comprising a connection from the change-in-situation-value function to an input of the network.

The desired behavior also requires that the agent learn to "tact" stimulus properties, usually with conventional names but at a minimum by some unique response to the stimulus properties. The word "tact" as used herein means to name or label after Skinner's work. The training procedures taught in U.S. Pat. No. 5,802,506 describes an efficient methods for training tacts.

In most cases of interest, the desired behavior also requires that the agent learn to self-echo (repeat) its prior verbal responses, which must also be trained and enabled by the agent architecture. The self echoing requires an agent architecture with recurrent connections or lagged sensors as shown and described in greater detail with reference to FIG. 1. The training procedures taught in U.S. Pat. No. 5,802,506 are useful in this regard.

The present invention enables an adaptive agent without hidden network nodes to solve a class of problems that on the surface appears to require hidden nodes, but that is solved poorly even by networks with hidden nodes. For example, a network trained to identify matching stimuli side by side using hidden nodes will generally fail when the stimuli are above and below each other (or any other change in relative position), or if any time delay is introduced. The mechanism in accordance with the present invention overcomes this huge weakness. The mechanism in accordance with the present invention enables an adaptive agent without hidden network nodes to solve a class of problems that on the surface appears to require hidden nodes, but that is solved poorly even by networks with hidden nodes.

An adaptive critic architecture is a preferred architecture to implement the device in accordance with the present invention. A defining feature of adaptive critics (e.g., Barto, 1992) and related adaptive systems is that each output/response has a value that, after training, is an estimate of the value of the situation if that response is executed. If the system performs only one response each cycle, the value of the situation is the value of the highest-valued response, since that is the response that will be executed. In a system that executes multiple responses each cycle, the value depends on some function of the responses that will be done.

The change in the situation value is an essential feature of adaptive critics because it, The change in the situation value is an essential feature of adaptive critics because it, along with the change in primary values, produces the signal used for learning. These principles are illustrated in copending U.S. patent application entitled "Adaptive Autonomous Agent with Verbal Learning" (Ser. No. 08/451,543, now issued as U.S. Pat. No. 5,802,506) having the same inventor as the inventor of the present application and incorporated herein by reference.

The mechanism in accordance with the present invention, in contrast with most prior solutions, will enable the agent to generalize; i.e., it will correctly recognize matching vs. non-matching with new pairs of stimuli. As prerequisites for producing matching judgments, the agent must have learned to make differentiated responses to stimulus properties of interest (known as "tacting"—related to naming—following Skinner, 1957, Verbal Behavior) and to repeat its own prior responses ("self-echoing" following Skinner, 1957). Self-echoing is unnecessary in special cases, such as when the agent simultaneously hears one stimulus (such as the word "ball") and sees the other stimulus (a ball or other object). In another special case, the first stimulus may produce not a tact but some other verbal association. E.G., the agent sees a screw, says "need screwdriver," and repeats "screwdriver" while searching for one. The present invention solves such special cases without modification.

Apparatus

The best mode of practicing the present invention is in an agent with the architecture described in the Hutchison patent application and illustrated in FIG. 1. It would be most valuable in adaptive critic architectures, but could be used with almost any network architecture. In FIG. 1, Each element can be implemented in hardware or software (i.e., the system can be a freestanding robot or an electronic agent in a computer).

Sensors (1) acquire information and convert it into a form appropriate for input to Network Stimuli (2). Sensors may comprise Recurrent internal connections (1A) that sense the system's own previous outputs on a one-to-one basis or alternatively external sensors that detect system actions (FIG. 1 shows direct internal connections, the preferred embodiment). Alternatively, sensors could be connected to intermediate "hidden" nodes in the network. At a minimum, the sensor detects whether the response was executed, but if internal connections are used, the input can also detect an absolute or relative measure of value even for unexecuted responses, if such information is essential or valuable for the system's desired performance.

Optionally, proprioceptive sensors (1B) are used to detect states of the agent's body, if required by the kinds of tasks desired for the agent (e.g., the position of the agent's arm). External sensors (1C) may also be included to sense inputs from light or sound sensors, that may be preprocessed (e.g. from an electronic speech analysis system or Fourier analyzer; raw shapes in letters or recognized discrete letters). The external information may come from sources in a 3-D environment or from a pure electronic environment, such as the value in a database or from an Internet connection. External sensors 1C should include sensors to indicate current receipt of Primary Values from the environment where this information is required or valuable for the system's actions. Sensors may also comprise a sensor for each Primary Value in the system (1D) that senses the current accumulation of the primary value or other measure from which change can be detected. Examples include the battery charge level, money in an account, or number in a counter.

Sensors (1) are connected to Input or stimulus nodes (2) within the network, that are activated by signals from the sensors (1) and connect to other nodes within the network. Each sensor dimension typically connects to more than one input node. For example, a proprioceptive arm position sensor might be connected to three input nodes: one for arm up, one for arm down, and one for arm half-way between. In the case of electronic character (ASCII) input, there might be an input node for each possible ASCII value.

To maintain information about inputs beyond the immediate presentation, "lagged" nodes and, To maintain information about inputs beyond the immediate presentation, "lagged" nodes and, optionally, "decaying" nodes are used. Lagged nodes (2A) are a mechanism for inputting the past states of an input node. In the preferred embodiment, each input node is connected to a series of "lagged input nodes." Each lagged input node is activated by the state of the node at the previous time step. There may be between zero and a small number of lagged inputs, typically between 1 and 5.

Optionally, each sensor may also be connected to a Decaying input node (2B) that is activated by the associated sensor and by its own prior state, in such a way that if the external sensor is active the node will be activated, but if the sensor is inactive the decaying node will decrease its activation level each time step. Various functions are possible, but a typical decay function is NewActivation= PriorActivation * 0.7, with an activation of 0 after the level drops below a threshold such as 0.1.

Output or response nodes (3) receive the value from the network activations. In simple designs, the highest-value output node activates its corresponding Actuator (i.e., "winner-take-all"). Optionally, more than one output node at once may activate Actuator nodes: nodes with values above a threshold, or the highest-valued node within each mutually-incompatible set (e.g., lift arm and lower arm).

Actuator nodes (4) may be connected to anything, including a motor, printer, video display, modem, sound or speech production system, or even to no external actuator (but still with recurrent connections in 1A above). The actuators must be adequate for performing the system's desired external behavior, but they should also include verbal responses necessary for the system's "internal" processes, if these are not also in the former set. For example, a robot may only be required to perform motor movements, but will need some kind of verbal outputs to learn any verbal behaviors required for controlling the movements. Actuator nodes 4 may be organized in groups where only one actuator node in the group is active at any time step.

Neural network (5) may be implemented in hardware or software. Many network architectures (or equivalent data structures) would be adequate, provided they accept a variety of input types and produce a set of numerical outputs, and that the structure is amenable to an adaptive critic or reinforcement learning algorithm in the general sense described by Barto (1992). Higher-order nets (Giles & Maxwell, 1987) that include direct input-output connections are relatively more feasible for this device than in mainstream neural network applications due to their reduced need for hidden node (5A). In general, networks with direct connections are far preferable given their much faster learning rates and reduced computation and storage needs. It will often be advantageous to make use of a mechanism for adding hidden nodes as necessary, as described, for example, by Fahner & Eckmiller (1994) and Redding, Kowalczyk, & Downs (1993). Any available technique for neural network implementation may be used.

A plurality of Primary Values (6) are stored in storage means suitable for the particular system; these values will be referenced in the system's Primary Value Function generator (7). Examples of primary values include batteries for a robot to store electrical charge, a tank for water or fuel, a holder for money, a counter to store abstract units of value such as points. Exceptions to this requirement may be Primary Values whose specifications do not require accumulation; e.g. "pain" from touching certain sensors. In a robotic system, the depletion of stored Primary Values (e.g., fuel, water) will occur automatically; in a simulated system, this depletion must be programmed or included in the Primary Value amounts. It may be advantageous in simulated systems to program a "metabolism" process to deplete specified Primary Values each time step in addition to the variable action-dependent depletions (e.g., motor responses use more energy than speaking; some energy and other Primary Values are usually depleted in each time step independent of the selected actions).

Change Sensors (8) output the amount by which its input changes in one time step, and comprise Change Sensor (8A) for the Primary Value Function and Change Sensor (8B) for the Situation Value=value of the maximum valued Output node (or a function of multiple Outputs if the system permits such). In accordance with the present invention, the output of the situation value change sensor 8B is coupled back as an input to the network via input node. Summator (9) outputs the sum of its inputs.

The situation value can be, for example, determined from the sum of the highest actuator value for each actuator group. However, the input sensor coupled to detect the "Change in Situation Value" (CSV) signal from change sensor 8B always senses the change over a single recent time step. CSV functions only as a sensory input and does not affect the learning signal.

Preferably, the learning process (10) would be of the adaptive critic class (Barto, 1992; Miller, Sutton, & Werbos, 1990), implemented in hardware or software. Learning modifies the network connections and occurs in each time step. The system processes sensory input, responds, and learns in a series of discrete time steps. The algorithm must be properly matched with the other elements of the system, using techniques well-known in the art.

The learning take place each input-output-evaluation cycle in the preferred implementation. The learning may modify only connections that were just active or following Sutton's (1984) lambda procedure, may modify previously-active connections to a lesser extent.

Simulation Results:

A simulation showed a behavioral process that solves not only solution to the XOR problem, but a much broader class of nonlinear problems such as matching-to-sample (MTS) and delayed MTS within a linear network. The central behavioral formulation of this simulation is closely related to Lowenkron's concept of joint control (1991), that is a special case of combining separately-conditioned antecedents (Rescorla & Wagner, 1972) if we accept the equivalence of respondent and operant conditioning as described by Donahoe et al. in "The S-R Issue: Its status in Behavior Analysis" published in the *Journal of the Experimental Analysis of Behavior* (March 1997). Unlike Donahoe et al.'s passive subsystem, a behaving system does not have to sense both (more generally, all) the stimuli simultaneously and respond instantaneously. It can, and often must, sense the stimuli in sequence (e.g., looking at one after another) and respond to them in sequence, sometimes with a delay. Its own responses become part of the stimuli controlling subsequent responses. Lowenkron discusses verbal tact and self-echoic responses, but the analysis applies more generally to any discriminated and self-repetitious responses and to many types of stimuli and experimental arrangements.

Using the method and apparatus in accordance with the present invention, a simulated organism with no hidden units was trained to tact each of four different stimuli (e.g., "A", "B", "C", and "D"), and then to self-echo the tact if a new stimulus was not presented. Eight combinations of two pairs of the stimuli (AA, AB, BA, BB, CC, CD, DC) were then presented in random order. In each case, the system tacted the first stimulus presented (e.g., "A"), after which the second stimulus was presented ("A" or "B"). If the second stimulus was the same as the first, the same response was emitted with increased strength (i.e., an increase in situation value) due to the joint stimulus control as a tact and self-echoic (i.e., active connections from both the new external stimulus and form the sensors for its prior responses).

Conversely, when the two stimuli were different, the new external stimulus was an S-delta (a stimulus that inhibits a response) for the self-echoic response while the stimulus produced by the system's own previous tact was an S-delta for the second tact (e.g., tacting "A" was weakened by presentation of the stimulus for "B" due to prior consequences for that relation). This combination of connections produces a decrease in situation value. This reliable difference in situation value transitions, positive or negative, always occurred before the system was required to emit its response indicating "same" or "different,"0 so reinforcement of correct same/different responses produced effective stimulus control by that event within 100 trials. This is an ordinary case of operant conditioning in the network, whereby a stimulus (the value change) is presented and different responses (saying "same" or saying "different") are reinforced depending on whether the stimulus change is positive or negative. When delays were introduced between presentation of the two stimuli, the system still produced the correct answers by emitting self-echoics during the delay, as we assume humans often do. For example, the agent would repeat "A, A, A, . . . " until the comparison stimulus was presented.

This process has important advantages over hidden-unit solutions. The system in accordance with the present invention can almost immediately discriminate matches for any new pairs of stimuli it can tact. No additional training is necessary because the stimulus control is by a property that is independent of the particular stimuli (i.e., the situation value change). This process seems to help explain many complex behaviors otherwise difficult to explain, such as "parity" (Palmer, 1996).

This demonstration does not prove that combinatorial nodes/neurons do not exist (they probably do), but the simulations thoroughly refute the claimed necessity of such elements in the prototypical case, XOR, and even the more difficult delayed match-to-sample case.

Except for extremely simple (e.g., one-response) "words" used for tacts, a simple "reward correct and punish wrong" procedure will not usually provide adequate performance. Therefore, a user needs to apply something like the "prompt and fade" methods described in U.S. Pat. No. 5,802,506 issued on Sep. 1, 1998. To ease understanding of the present invention, these procedures are not described again herein, although the teachings of the patent are incorporated herein by reference. It is important to understand the present invention is independent of how the tacts and self-echoics are trained, and the present invention is not limited to prompt and fade procedures although they are a preferred implementation as of the time this application was filed. It is important only that the agent has been trained to tact the stimulus patterns that will be presented to the agent in operation. It is contemplated that other training procedures will produce adequate results in particular applications and such procedures are equivalent to those specifically described herein.

The agent uses one or more of its normal outputs from the network to indicate matching and/or nonmatching. There are typically two separate outputs used to indicate "yes" and "no" responses (or any other binary actuator response). However, these separate responses could be combined into a single output (e.g., raise arm to indicate "yes"), where not doing the response indicates "no". Yes/no responses may also be indicated by a set of parallel or sequential responses, such as when humans say "no" by tightening our diaphragm, raising tongue, etc. all at substantially the same time. Alternatively, responses can be the same outputs used to tact the objects (e.g., after tacting a "net", it indicates a negative by saying "no" with some of the same movements), although it is often easier to train separate response types (e.g., speaking responses for tacting and arm movements for yes/no).

The network has to learn to do the yes/no responses following positive and negative inputs from the CSV. This is a typical operant learning problem, and is easy to train and easy for a network to learn, as follows: after any given change in situation value (CSV) signal, we reinforce correct responses (saying yes when CSV is positive and saying no when CSV is negative) and punish incorrect responses (saying yes when the CSV is negative and saying no when the CSV is positive). After not too many trials, the agent will learn the correct response.

The simplicity of the training masks the fact that the CSV is not directly under the trainer's control, so he cannot just present trials with CSV and yes/no. The prior training and the stimulus presentations solve this problem. If the agent has learned tacting and self-echoics for the stimuli to be used, then presenting two matching or nonmatching stimuli in a row will produce positive and negative CSVs with suitable reliability.

Three main scenarios cover most applications of the present invention: Case 1 uses two stimulus patterns that will be presented to the same agent sensors (e.g., two pictures of objects) one after the other. Provide an adaptive critic type network with the change in situation value (CSV) mechanism, sensors and inputs sufficient to sense the stimulus patterns that will be presented, recurrent or lagged inputs to sense the network's own tact responses (so the network can self-echo), and outputs sufficient to make the tacts for the desired stimulus patterns and to make yes/no responses. Further provide that the network has already been trained by any means to tact the objects and to self-echo its own tact responses (i.e., when red is presented, to tact "red" and then to repeat "red" until needed).

Present the first stimulus to the network, and the agent will tact it correctly, given the assumed training. Then present the second stimulus. If it is the same, the agent will have a positive CSV signal because saying "red" is strengthened both by the red object present and by tending to say red again as a self-echo because of having just said it. Then the agent's next response will be the yes or no response, e.g., lift or drop arm. If the agent makes a correct response, reinforce; otherwise, punish. After presenting a series of these training trials with different objects and both matching and nonmatching pairs, the agent will learn to make correct yes/no responses. If desired, the relative strengths of yes and no responses can be monitored to indicate a quantitative output of "how similar" pairs of stimuli are. Alternatively, the agent can learn to output a response that is contingent on CSV magnitude (e.g., move a slider on a scale).

Case 2 uses two stimulus patterns of different sensory modes that can be sensed at the same time (e.g., a picture of an object and the sound comprising the name of an object). Provide the same network and prior training as in the Case 1 example, except that recurrent or lagged sensors are not required for its tacting responses nor does the agent have to have been trained to self-echo. However, the agent does in addition have to be trained to echo. As before, the agent must have learned tacts for objects corresponding to the stimulus.

Both stimuli are presented to the network at the same time. If the object matches the spoken tact (e.g., seeing a red object and hearing "red"), the agent will make a strong tacting response to the object, because it is both tacting the visual stimulus and echoing the spoken stimulus. This will produce a positive CSV, that the network input will sense. A number of training examples are presented as in the case 1 example to teach correct responding.

Case 3 expands the applicability of the process: the agent is trained to respond with verbal associations ("intraverbals" after Skinner, 1957) to the tacts it knows, such as saying "Need key" after tacting a "lock" in certain situations, or saying "dog" after saying "perro". In this example, the agent and prior training are essentially similar to that in Case 1, but also assume provision of prior intraverbal training. Then the procedure is substantially similar, however, after the first presentation and its tact response, time is allowed for the agent to emit one or more intraverbal responses before presenting the second stimulus.

It should be noted that in Case 1 the stimuli were presented in sequence. The environment might present them to the agent in sequence, or the agent might present them to itself in sequence by actively scanning. Active scanning is performed, for example, when the agent is trying to "pick the matching object" by looking at a sample stimulus and then looking at a comparison stimulus next to it.

The preferred embodiment uses a learning procedure that, like many learning algorithms, can cause problems for the training of matching. After each instance where change in situation value (CSV) increases, the network will tend to adapt by reducing connection weights involved; likewise, it tends to increase connection weights when CSV decreased. This dynamic process undermines learning matching because the magnitudes of CSV decrease and become harder to discriminate.

There are two general solutions.

1. During training of the matching response, intersperse trials to practice the simple tact and self-echoic behaviors, to restore their connection weights.

2. Use a larger number of pairs of matching and nonmatching objects during training, so that the matching response will be learned before all the connection weights degrade.

It is contemplated that the present invention may be used as a specialized match-sensing agent by directly monitoring the CSV magnitude. In such a case, instead of making the network learn to make an external response to the CSV, the user just monitors the CSV magnitude directly. Such an implementation still requires an adaptive critic network (i.e., a network that is reinforcement learning based), but does not need a network input coupled to receive the CSV signal as in the preferred implementations. Although such an implementation does not exploit all of the advantage of the present invention, it may be very useful for some applications.

Figure 2:
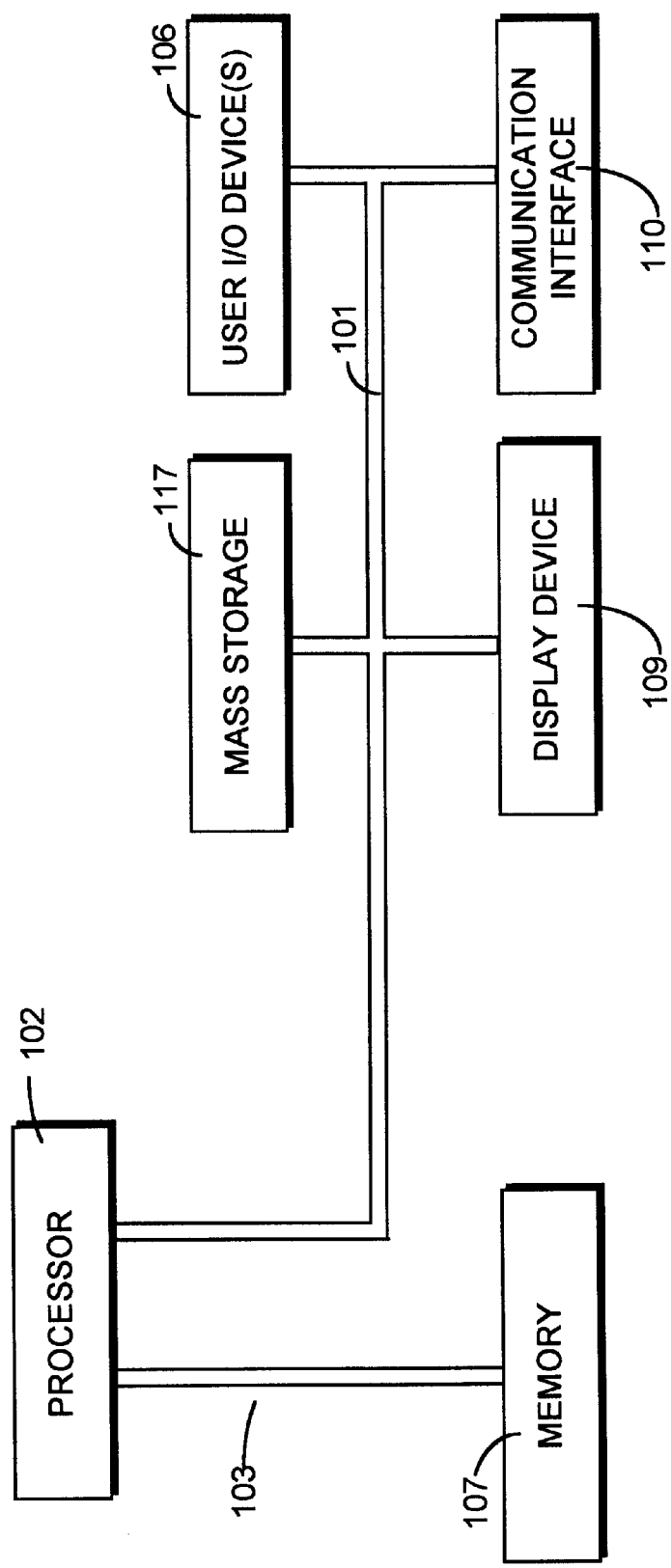
FIG. 2 illustrates in block diagram form a computer system incorporating an apparatus and system in accordance with the present invention.

FIG. 2 illustrates in block diagram form a computer system incorporating an apparatus and system in accordance with the present invention. Processor architectures and computing systems are usefully represented as a collection of interacting functional units as shown in FIG. 1. These functional units, discussed in greater detail below, perform the functions of fetching instructions and data from memory, processing fetched instructions, managing memory transactions, interfacing with external I/O and displaying information.

The present invention is described in terms of an apparatus and method particularly in a distributed computer system comprising multiple computer systems, or a standalone computer system such as shown in FIG. 2. The particular examples represent implementations useful in a number of alternative processor architectures and operating system platforms. Accordingly, these alternative embodiments are equivalent to the particular embodiments shown and described herein. FIG. 2 shows a typical general purpose computer system incorporating a processor 102 and using both an application program and an operating system executing in processor 102. The computer system is schematically represented by box 108. The computer system in accordance with the present invention comprises an address/data bus 101 for communicating information, processor 102 coupled with bus 101 through input/output (I/O) devices 103 for processing data and executing instructions, and memory system 104, coupled with bus 101 for storing information and instructions for processor 102. Memory system 104 comprises, for example, one or more levels of cache memory and main memory in memory unit 107.

User I/O devices 106 are coupled to bus 101 and are operative to communicate information in appropriately structured form to and from the other parts of computer 100.

User I/O devices may include a keyboard, mouse, magnetic or tape reader, optical disk, or other available I/O devices, including another computer. Mass storage device 117 is coupled to bus 101 and may be implemented using one or more magnetic hard disks, magnetic tapes, CD ROMs, large banks of random access memory, or the like. A wide variety of random access and read-only memory technologies are available and are equivalent for purposes of the present invention. Mass storage 117 includes computer programs and data stored therein. Some or all of mass storage 117 may be configured to be incorporated as part of memory system 104.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. An adaptive agent comprising:
    an artificial neural network having a plurality of sensor input nodes for receiving input signals representing physical objects or activities and a plurality of output nodes generating responses to external devices for causing the external devices to perform physical acts, wherein the neural network provides a weighted coupling between the input nodes and the output nodes;
    a situation value unit receiving signals from a plurality of the responses and generating a situation value signal and generating a situation change output signal representing a change of the situation value signal from a prior time to a current time; and
    a connection coupling the situation change output signal to one of the sensor input nodes of the artificial neural network to provide a stimulus to the neural network.

2. The agent of claim 1 wherein the neural network comprises an adaptive critic.

3. The agent of claim 1 wherein the situation value signal comprises an n-dimensional vector representing a current state of the output nodes.

4. The agent of claim 1 wherein the situation value signal comprises a single value determined from a combination of the current values generated at the output nodes.

5. The agent of claim 1 wherein one or more of the network output nodes indicates matching between a stimuli applied to the nodes.

6. The agent of claim 1 wherein the magnitude of the situation value signal is equal to the value of the highest-valued response generated by the output nodes.

7. The agent of claim 1 wherein the output of the situation change output signal is further coupled to provide a learning signal for the artificial neural network.

8. The agent of claim 1 wherein the input nodes further comprise:
    a first set of sensor input nodes coupled to receive a number of input signals representing an example object; and
    a second set of sensor input nodes coupled to receive a number of input signals representing an examined object,
    wherein at least one of the responses represents a match between the example object and the examined object.

9. The agent of claim 8 wherein one of the responses represents a name of the example object, wherein the name comprises an abstraction of preselected properties of the object, and wherein the properties are selected as properties relevant to perform a matching between the example object and the examined object.

10. The agent of claim 9 wherein the response representing a name comprises a sequence of signals generated on one or more of the output nodes.

11. The agent of claim 9 wherein the response representing a name comprises a plurality of parallel signals generated on a plurality of output nodes.

12. The agent of claim 1 wherein the agent is implemented in software program devices in a memory of a computer system.

13. The agent of claim 1 wherein the artificial neural network comprises a linear network formed without hidden nodes.

14. The adaptive agent of claim 1 further comprising:
    a learning process coupled to the neural network and operable to modify the weighted coupling each time step, wherein the situation change output signal is further coupled to the learning process.

15. A method of training an artificial neural network to emit a response indicating when a sample pattern matches a stimulus pattern, the method comprising the steps of:
    providing an adaptive critic-type artificial neural network having a plurality of network sensor inputs for receiving input signals and a plurality of outputs generating responses, wherein the artificial neural network provides a weighted coupling between the network inputs and the outputs;
    training the neural network to tact at least one sample pattern;
    training the neural network to echo the at least one tact;
    generating a situation value signal at each time step;
    over a plurality of time steps, applying a set of stimulus patterns to the network sensor inputs, wherein the set of stimulus patterns includes at least one stimulus pattern corresponding to the sample pattern;
    each time step, comparing the current situation value to a previous situation value to determine a change in situation value;
    after determining each change in the situation value signal, reinforcing responses that correctly indicate matching and nonmatching; and
    repeating the steps of applying the stimulus pattern and reinforcing until the agent learns a correct response, wherein said training the neural network to echo comprises:
        coupling the change in situation value signal to a sensor input of the neural network to provide a stimulus to the neural network; and
        training the neural network to self-echo the previously trained tact.

16. The method of claim 15 wherein one of the plurality of outputs generates a tact response.

17. The method of claim 14 wherein training the neural network to echo further comprises:
    applying an external stimulus pattern corresponding to the tacted sample pattern to at least some of the sensor inputs; and
    training the neural network to echo the stimulus pattern corresponding to the tacted sample pattern.

18. The method of claim 14 further comprising punishing incorrect responses after each change in the situation value signal.

19. The method of claim 18 wherein said incorrect response comprises an affirmative response when the change in situation value is negative and a negative response when the change in situation value is positive.

20. The method of claim 14 further comprising presenting a series of stimulus patterns to a first set of sensor input nodes of the network while self-echoing the patterns of the tacted samples to a second set of sensor input nodes of the network.

21. The method of claim 14 wherein said correct response comprises an affirmative response when the change in situation value is positive and a negative response when the change in situation value is negative.

22. The method of claim 14 wherein the sample pattern comprises data representing the sample object in multiple modes.

23. An adaptive software agent operating on a computer having a processor and a memory, the software agent comprising:

computer implemented program code devices configured to cause the computer to provide an adaptive critic-type artificial neural network in the memory, the network having a plurality of sensor inputs and an output, wherein the sensor inputs have a weighted coupling to the output;

computer implemented program code devices configured to cause the computer to train the network to tact at least one sample pattern;

computer implemented program code devices configured to cause the computer to generate a situation value signal at each time step;

computer implemented program code devices configured to cause the computer to apply a set of stimulus patterns to the network inputs over a plurality of time steps, wherein the set of stimulus patterns includes at least one stimulus pattern corresponding to the sample pattern;

computer implemented program code devices configured to cause the computer to compare the current situation value to a previous situation value to determine a change in situation value;

computer implemented program code devices configured to cause the computer to reinforce correct responses after each change in the situation value signal, said correct responses being responses that indicate a match when the stimulus pattern matches the sample pattern and responses that indicate a non-match when the stimulus pattern does not match the sample pattern;

computer implemented program code devices configured to cause the computer to apply the change in situation value to a sensor input; and computer implemented program code devices configured to cause the computer to repeat the step of applying the stimulus pattern until the agent learns the correct response.

24. A computer data signal embodied in a carrier wave comprising:

a first code portion comprising code configured to cause a computer to provide an adaptive critic-type artificial neural network in the memory, the network having a plurality of sensor inputs and an output, wherein the sensor inputs have a weighted coupling to the output;

a second code portion comprising code configured to cause the computer to train the network to tact at least one sample pattern;

a third code portion comprising code configured to cause the computer to generate a situation value signal at each time step;

a fourth code portion comprising code configured to cause the computer to apply a set of stimulus patterns to the network inputs over a plurality of time steps, wherein the set of stimulus patterns includes at least one stimulus pattern corresponding to the sample pattern;

a fifth code portion comprising code configured to cause the computer to compare the current situation value to a previous situation value to determine a change in situation value;

a sixth code portion comprising code configured to cause the computer to reinforce correct responses after each change in the situation value signal, said correct responses being responses that indicate a match when the stimulus pattern matches the sample pattern and responses that indicate a non-match when the stimulus pattern does not match the sample pattern;

a seventh code portion comprising code configured to cause the computer to apply the change in situation value to a sensor input; and an eighth code portion comprising code configured to cause the computer to repeat the step of applying the stimulus pattern until the agent learns the correct response.

* * * * *